United States Patent
You et al.

(10) Patent No.: US 10,382,270 B2
(45) Date of Patent: Aug. 13, 2019

(54) METHOD AND MTC DEVICE FOR RECEIVING DOWNLINK CHANNEL

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Suckchel Yang, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/513,946

(22) PCT Filed: Sep. 24, 2015

(86) PCT No.: PCT/KR2015/010082
§ 371 (c)(1),
(2) Date: Mar. 23, 2017

(87) PCT Pub. No.: WO2016/048056
PCT Pub. Date: Mar. 31, 2016

(65) Prior Publication Data
US 2017/0272322 A1    Sep. 21, 2017

Related U.S. Application Data

(60) Provisional application No. 62/054,997, filed on Sep. 25, 2014, provisional application No. 62/073,034, (Continued)

(51) Int. Cl.
*H04L 5/00* (2006.01)
*H04L 12/24* (2006.01)
*H04W 72/04* (2009.01)

(52) U.S. Cl.
CPC ........ *H04L 41/0853* (2013.01); *H04L 5/0053* (2013.01); *H04L 5/0092* (2013.01);
(Continued)

(58) Field of Classification Search
CPC . H04L 41/0853; H04L 5/0055; H04L 5/0057; H04W 72/042; H04W 72/0413
See application file for complete search history.

(56) References Cited

U.S. PATENT DOCUMENTS

2010/0254367 A1* 10/2010 Lim ............... H04L 27/2607
370/344
2011/0013092 A1* 1/2011 Chung ............... H04W 16/06
348/732
(Continued)

FOREIGN PATENT DOCUMENTS

KR    20140071480    6/2014

OTHER PUBLICATIONS

Catt, "Considerations on E-PDCCH search space design," 3GPP TSG-RAN WG1 #68bis, R1-121102, Mar. 2012, 5 pages.
(Continued)

*Primary Examiner* — Qun Shen
(74) *Attorney, Agent, or Firm* — Lee Hong Degerman Kang Waimey

(57) ABSTRACT

Provided is a method for receiving a downlink control channel in a machine type communication (MTC) device. A method for receiving a downlink control channel can comprise the steps of: receiving first configuration information about an MTC device-operable subband among system bands of a cell; receiving second configuration information, about a subframe, for monitoring a downlink control channel in a cell-specific search space (CSS); and switching from a subband with respect to the first configuration information to a pre-configured cell-common subband and then receiv-
(Continued)

ing, in the cell-common subband in a subframe with respect to the second configuration information, a downlink control channel in the CSS and another channel.

6 Claims, 23 Drawing Sheets

Related U.S. Application Data filed on Oct. 31, 2014, provisional application No. 62/076,466, filed on Nov. 6, 2014, provisional application No. 62/149,686, filed on Apr. 20, 2015.

(52) U.S. Cl.
CPC ......... *H04W 72/042* (2013.01); *H04L 5/0055* (2013.01); *H04L 5/0057* (2013.01); *H04W 72/0413* (2013.01)

(56) References Cited

U.S. PATENT DOCUMENTS

| | | | | |
|---|---|---|---|---|
| 2011/0051632 | A1* | 3/2011 | Lim | H04L 27/2604 |
| | | | | 370/280 |
| 2013/0114522 | A1* | 5/2013 | Frenne | H04L 5/0094 |
| | | | | 370/329 |
| 2013/0139098 | A1 | 5/2013 | Li et al. | |
| 2014/0307697 | A1* | 10/2014 | Beale | H04L 5/0044 |
| | | | | 370/329 |
| 2015/0085778 | A1* | 3/2015 | Morioka | H04W 72/042 |
| | | | | 370/329 |
| 2015/0117342 | A1* | 4/2015 | Loehr | H04W 72/1284 |
| | | | | 370/329 |
| 2015/0181440 | A1* | 6/2015 | Chen | H04W 16/18 |
| | | | | 370/329 |
| 2016/0072614 | A1* | 3/2016 | Blankenship | H04L 5/0046 |
| | | | | 370/329 |
| 2016/0081084 | A1* | 3/2016 | Blankenship | H04L 5/0051 |
| | | | | 370/329 |

OTHER PUBLICATIONS

Samsung, "Coverage enhancements for low-cost MTC UEs," 3GPP TSG-RAN WG1 #73, R1-131973, May 2013, 4 pages.

Huawei, "Analysis and discussion on bandwidth reduction," 3GPP TSG-RAN WG1 #74, R1-132879, Aug. 2013, 7 pages.

PCT International Application No. PCT/KR2015/010082, Written Opinion of the International Searching Authority dated Jan. 12, 2016, 4 pages.

\* cited by examiner

METHOD AND MTC DEVICE FOR RECEIVING DOWNLINK CHANNEL

CROSS-REFERENCE TO RELATED APPLICATIONS

This application is the National Stage filing under 35 U.S.C. 371 of International Application No. PCT/KR2015/010082, filed on Sep. 24, 2015, which claims the benefit of U.S. Provisional Application No. 62/054,997, filed on Sep. 25, 2014, 62/073,034, filed on Oct. 31, 2014, 62/076,466, filed on Nov. 6, 2014, and 62/149,686, filed on Apr. 20, 2015, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

As a way for decreasing the costs of an MTC apparatus, the MTC apparatus may use a reduced band only, that is, a sub-band.

However, in the case that the region of the sub-band in which an MTC apparatus operates is not the center region (e.g., 6 PRBs in the center) of the system band of a cell, a problem occurs that the MTC apparatus fails to receive a cell-common channel/signal.

SUMMARY OF THE INVENTION

Accordingly, the disclosure of the specification has been made in an effort to solve the problem.

In order to accomplish the object described above, a disclosure of the present specification newly proposes a downlink control channel that may be transmitted within the band in which an MTC operates.

Particularly, in order to accomplish the object described above, a disclosure of the present specification provides a method for receiving a downlink control channel. The method may be performed by a Machine type communication (MTC) apparatus. The method may include receiving a first configuration information for a sub-band in which an MTC apparatus is operable among a system band of a cell; receiving a second configuration information for a subframe for monitoring a downlink control channel in a cell-specific search space (CSS); and after switching from the sub-band according to the first configuration information to a preconfigured cell-common sub-band, receiving the downlink control channel in the CSS and another channel in the cell-common sub-band according to the second configuration information.

The downlink control channel in the CSS may be an Enhanced Physical Downlink Control Channel (EPDCCH).

The method may further include receiving a downlink data channel in the sub-band according to the first configuration information.

One or more of the first configuration information and the second configuration information may be received through a high layer signaling.

When switching from a sub-band according to the first configuration information to a preconfigured cell-common sub-band on a subframe according to the second configuration information, a Radio Frequency (RF) unit may be re-tuned, not receiving a signal on a part of the front OFDM symbol of the subframe.

Meanwhile, in order to accomplish the object described above, a disclosure of the present specification provides a method for receiving a downlink channel. The method may be performed by a machine type communication (MTC) apparatus configured to operate only in a part of a sub-band among a system band of a cell. The method may include after hopping from a first sub-band among a system band of the cell in subframe k to a second sub-band, receiving a bundle of downlink channels repeated n times from subframe k to subframe k+n; and counting a number of the downlink channel being repeated in the received bundle, wherein, when the downlink channel is not received in subframe k, a number of subframe k not receiving the downlink channel is excluded from the counted number for hopping from the first sub-band to the second sub-band in subframe k.

When the number of subframe k not receiving the downlink channel is 1, the counted number may be n−1.

The method may further include receiving a bundle of subframe channels repeated n times from subframe k−n to subframe k; and counting a number of the downlink channel being repeated in the received bundle from subframe k−n to subframe k, and the counted number is n.

The method may further include receiving a first configuration information for a first sub-band and a second sub-band in which an MTC apparatus is operable in a system band of the cell; and receiving a second configuration information for a subframe for switching between the first sub-band and the second sub-band.

Meanwhile, in order to accomplish the object described above, a disclosure of the present specification provides a machine type communication (MTC) apparatus for receiving a downlink control channel. The MTC apparatus may include a RF unit; and a processor for controlling the RF unit, wherein the processor is configured to perform: receiving a first configuration information for a sub-band in which an MTC apparatus is operable among a system band of a cell; receiving a second configuration information for a subframe for monitoring a downlink control channel in a cell-specific search space (CSS); and after switching from the sub-band according to the first configuration information to a preconfigured cell-common sub-band, receiving the downlink control channel in the CSS and another channel in the cell-common sub-band according to the second configuration information.

According to embodiments of the present invention, the aforementioned problems of the existing technology will be solved.

DESCRIPTION OF EXEMPLARY EMBODIMENTS

Figure 1:
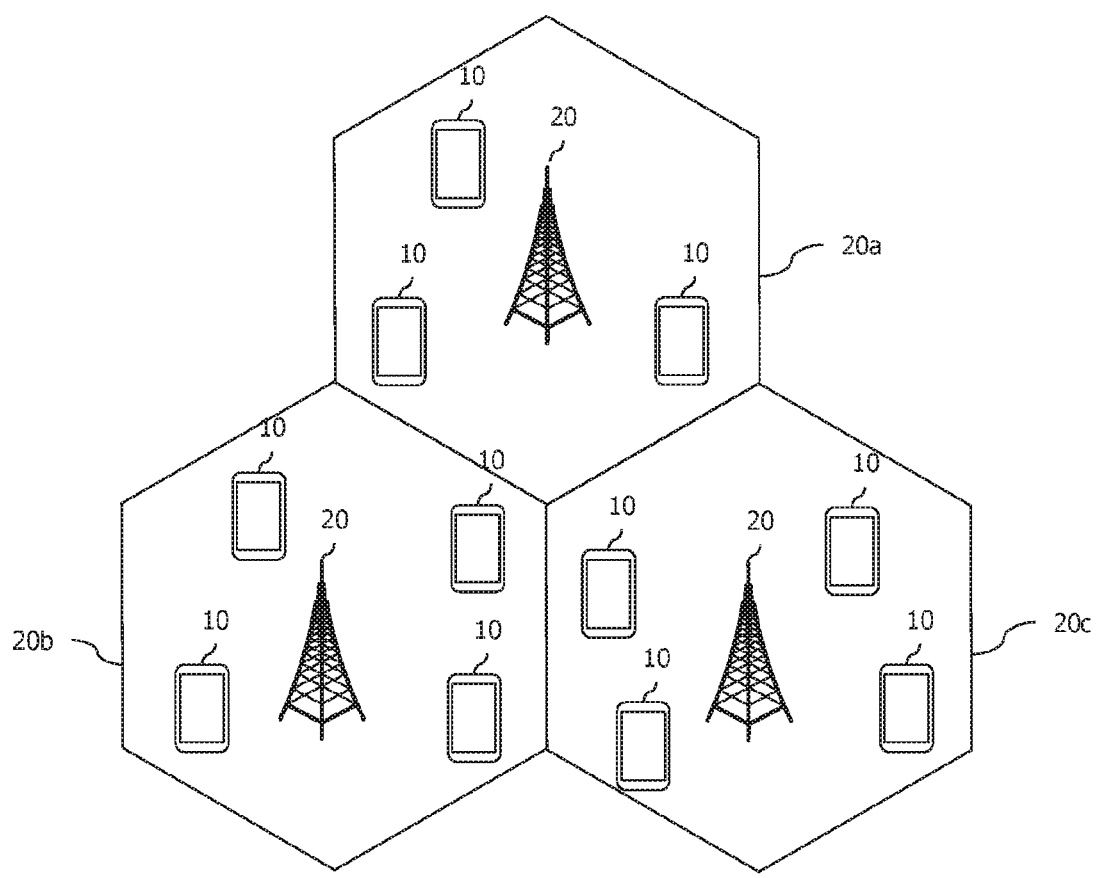
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
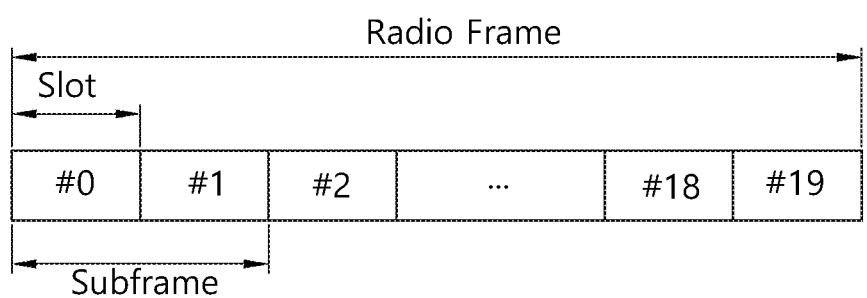
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
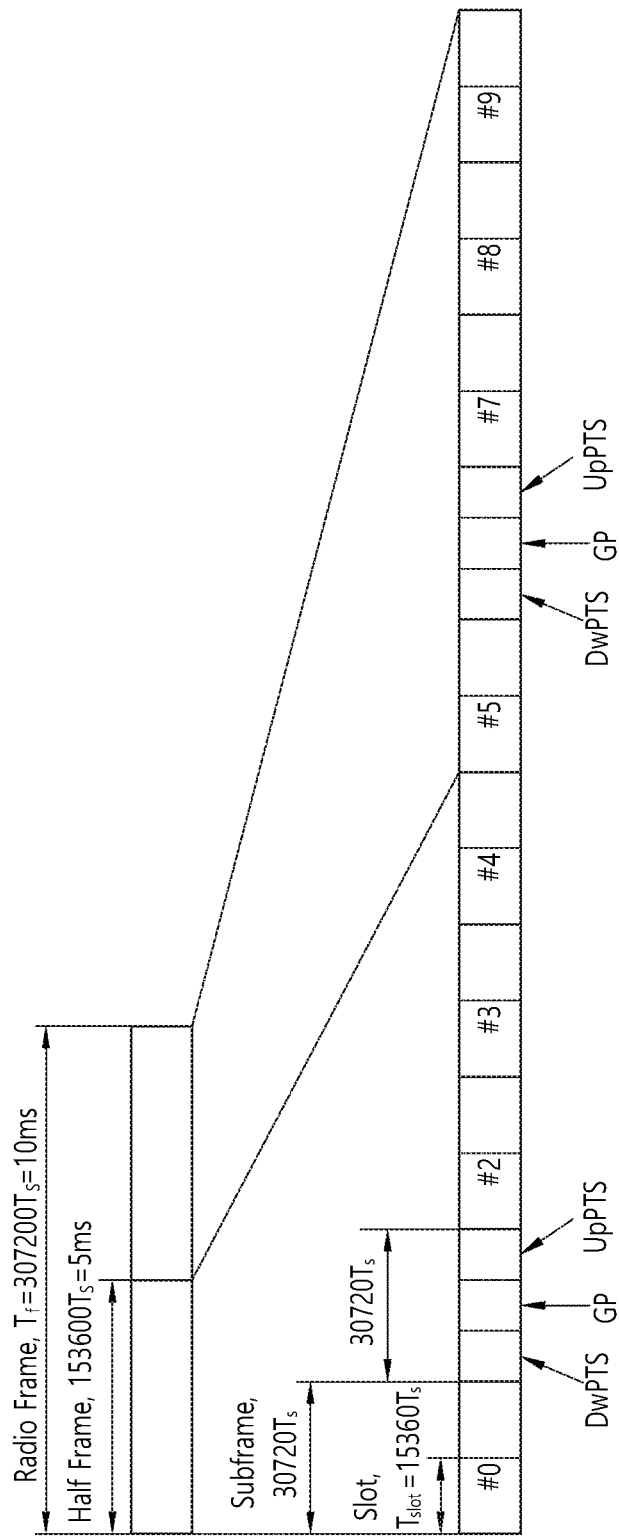
FIG. 3 illustrates the architecture of a downlink radio frame according to time division duplex (TDD) in 3GPP LTE.

FIG. 3 illustrates the architecture of a downlink radio frame according to TDD in 3GPP LTE.

For this, 3GPP TS 36.211 V8.7.0 (2009 May) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | DwPTS | UpPTS Normal CP in uplink | UpPTS Extended CP in uplink | DwPTS | UpPTS Normal CP in uplink | UpPTS Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
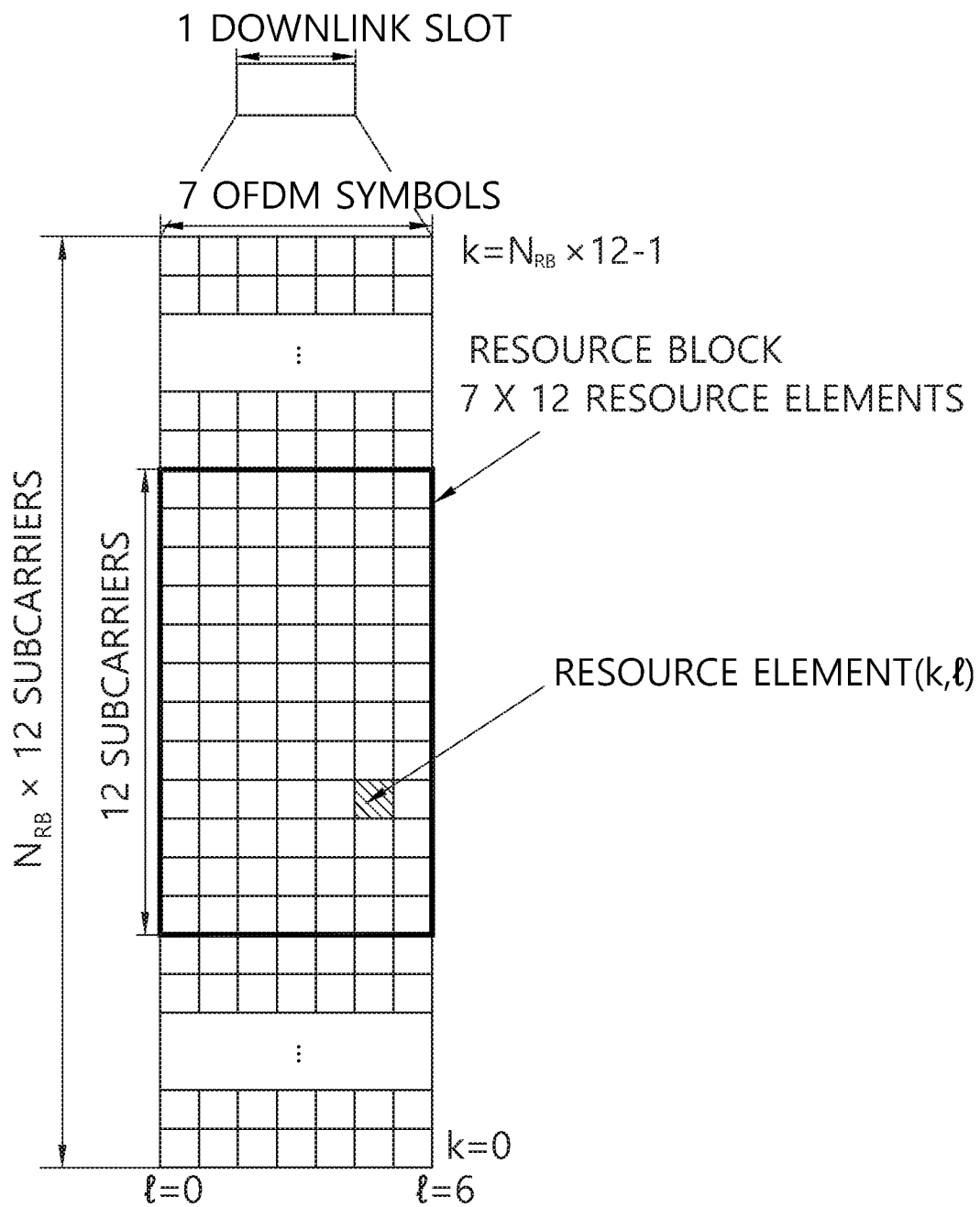
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
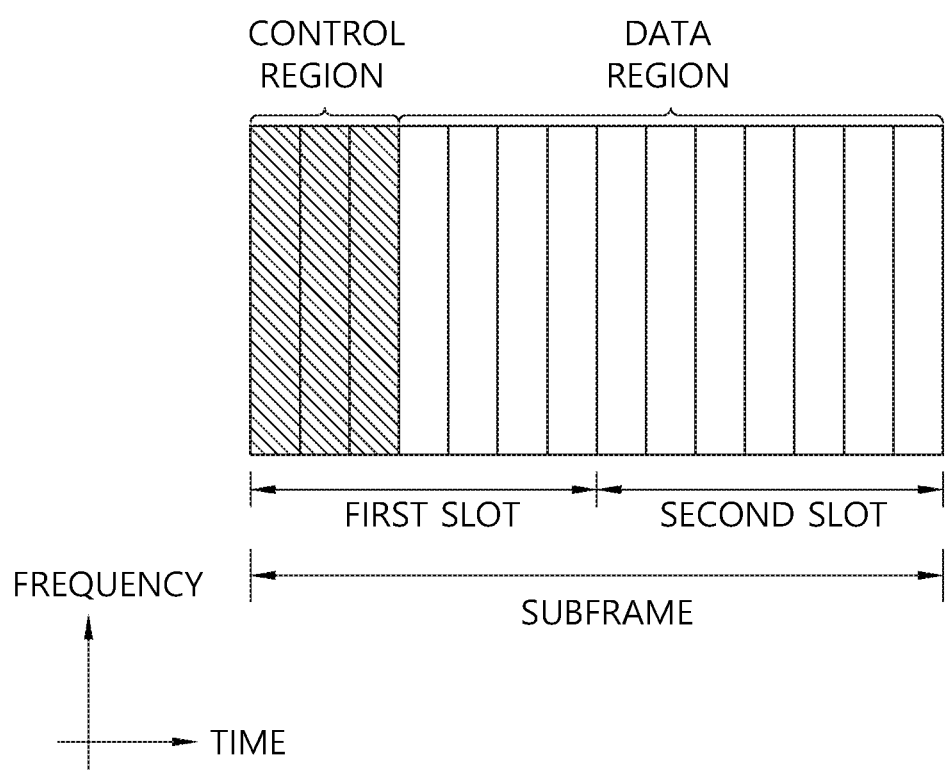
FIG. 5 illustrates the architecture of a downlink subframe.

FIG. 5 illustrates the architecture of a downlink subframe.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
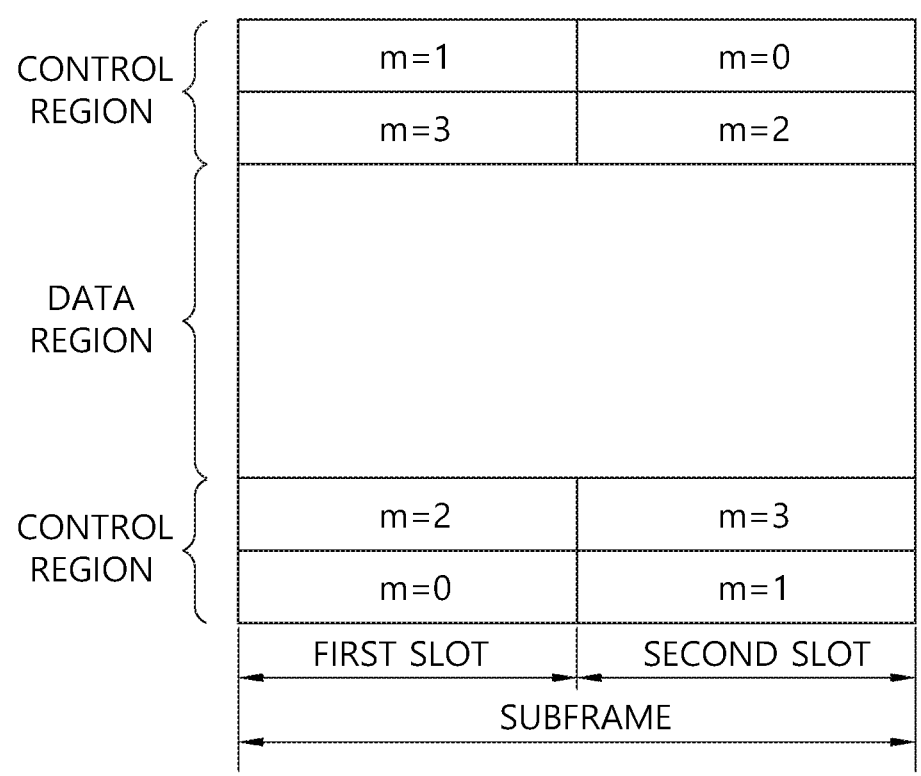
FIG. 6 illustrates the architecture of an uplink subframe in 3GPP LTE.

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier.

<EPDCCH (Enhanced Physical Downlink Control CHannel)>

Meanwhile, a PDCCH is monitored in a limited area called a control area within a subframe, and a CRS transmitted in the entire band is used to demodulate the PDCCH. As types of control information is varied and an amount of control information is increased, flexibility of scheduling is lowered only by the legacy PDCCH. Also, in order to reduce a burden of CRS transmission, an enhanced PDCCH (EPDCCH) has been introduced.

Figure 7:
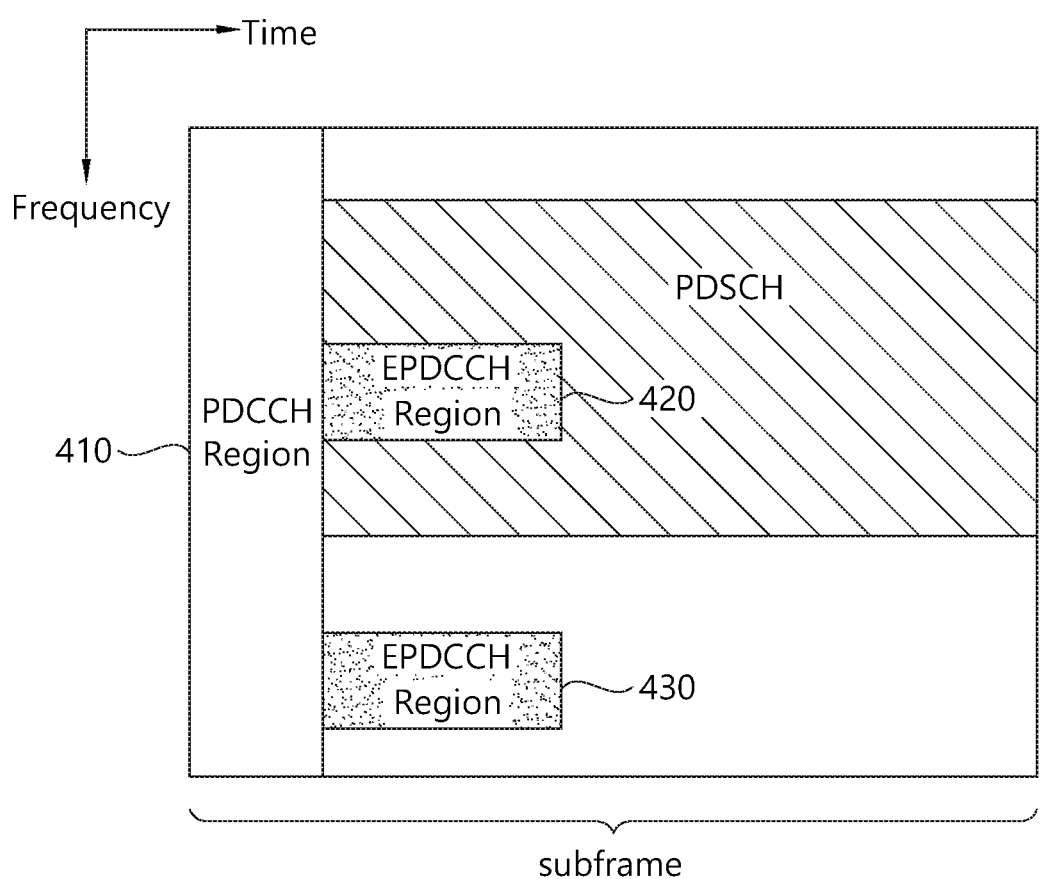
FIG. 7 illustrates an example of a subframe having an EPDCCH.

FIG. 7 illustrates an example of a subframe having an EPDCCH.

A subframe may include zero or one PDCCH region 410 and zero or more EPDCCH regions 420 and 430.

The EPDCCH regions 420 and 430 are regions in which a wireless device monitors an EPDCCH. The PDCCH region 410 is positioned within a maximum of four front OFDM symbols of the subframe, while the EPDCCH regions 420 and 430 may be flexibly scheduled in OFDM symbols after the PDCCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the EPDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, not the CRS, may be defined to demodulate the EPDCCH. An associated DM RS may be transmitted in the corresponding EPDCCH regions 420 and 430.

The EPDCCH regions 420 and 430 may each be used in scheduling for different cells. For example, an EPDCCH within the EPDCCH region 420 may carry scheduling information for a primary cell, and an EPDCCH within the EPDCCH region 430 may carry scheduling information for a secondary cell.

When an EPDCCH is transmitted in the EPDCCH regions 420 and 430 through multiple antennas, the same precoding as that of the EPDCCH may be applied to a DMRS within the EPDCCH regions 420 and 430.

Compared with a PDCCH which uses a CCE as a transmission resource unit, a transmission resource unit for an EPCCH is called an enhanced control channel element (ECCE). An aggregation level may be defined by a resource unit for monitoring an EPDCCH. For example, when 1 ECCE is a minimum resource for an EPDCCH, the aggregation level may be defined as L={1, 2, 4, 8, 16}.

Hereinafter, an EPDCCH search space may correspond to an EPDCCH region. In the EPDCCH search space, one or more EPDCCH candidates may be monitored at every one or more aggregation levels.

<Machine Type Communication (MTC)>

Meanwhile, the MTC will be described below.

Figure 8A:
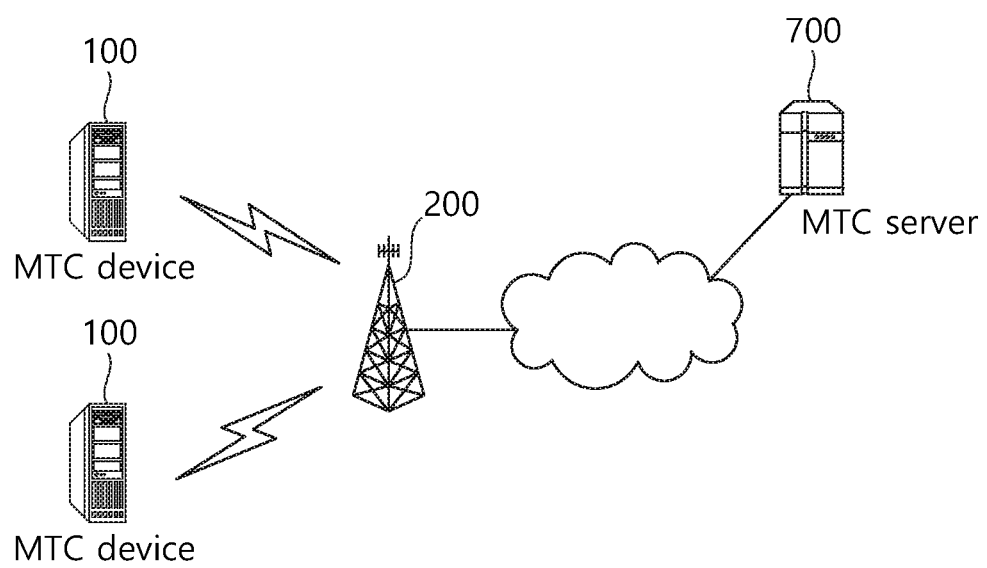
FIG. 8a illustrates an example of a machine type communication (MTC).

FIG. 8a illustrates an example of a machine type communication (MTC).

The machine type communication (MTC) refers to information exchange among MTC apparatuses 100, which human interaction is not accompanied through a BS 200 or information exchange between the MTC apparatus 100 and an MTC server 700 through the BS 200.

The MTC server 700 is an entity that communicates with the MTC apparatus 100. The MTC server 700 executes MTC applications and provides MTC-specific services for the MTC apparatus.

The MTC apparatus is a wireless device that provides MTC communication, and may be fixed or have mobility.

The services provided by the MTC are different from the services in the convention communication in which human is involved, and may include various kinds of services including tracking, metering, payment, medical service, remote control, and the like. In more particularly, the services provided by the MTC may include meter check, measuring water level, application of surveillance camera, stock report of vending machine, and so on.

In the MTC apparatus, amount of transmission data is small and uplink/downlink data transmission/reception occurs sometimes. Accordingly, the peculiarity of MTC apparatus is that it is efficient to decrease unit price of a MTC apparatus and decrease battery power consumption with being adjusted to the low data transmission rate. Such an MTC apparatus is characterized by low mobility, and accordingly, has characteristic that a channel environment is hardly changed.

Figure 8B:
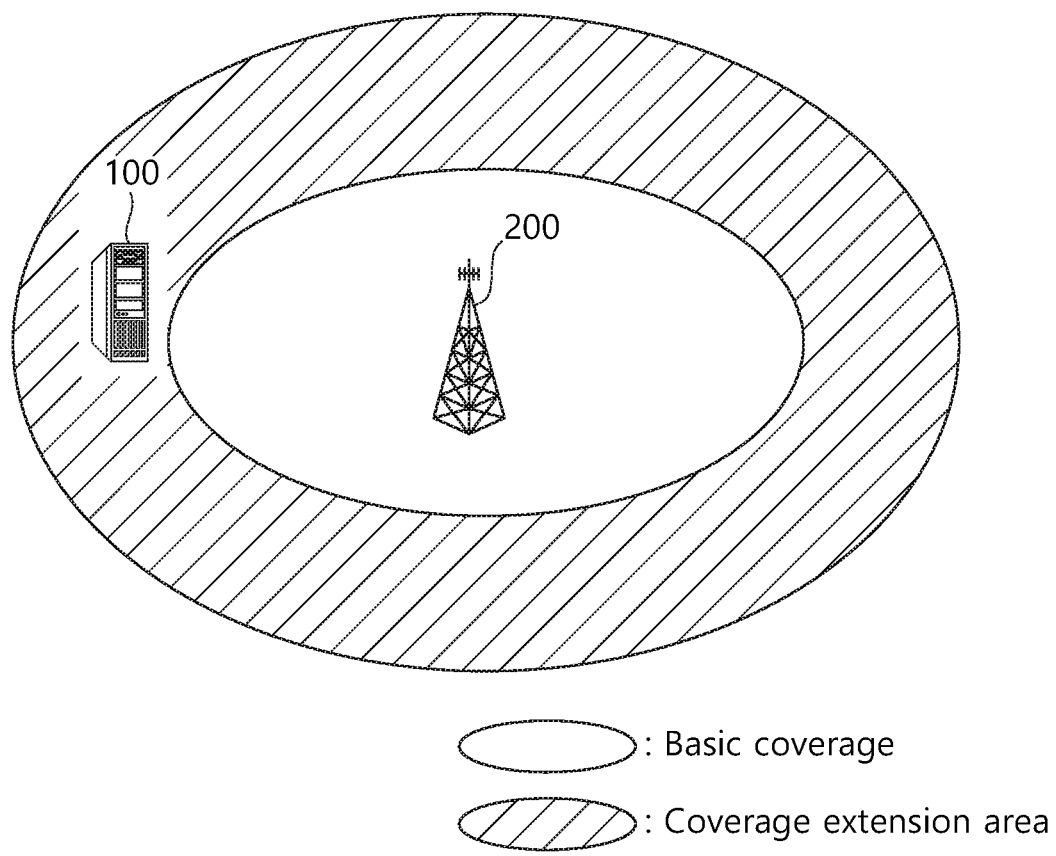
FIG. 8b exemplifies a cell coverage extension for an MTC apparatus.

FIG. 8b exemplifies a cell coverage extension for an MTC apparatus.

Recently, it has been considered to extend the cell coverage of BS for an MTC apparatus 100, and various techniques for the cell coverage extension are discussed.

Figure 9A:
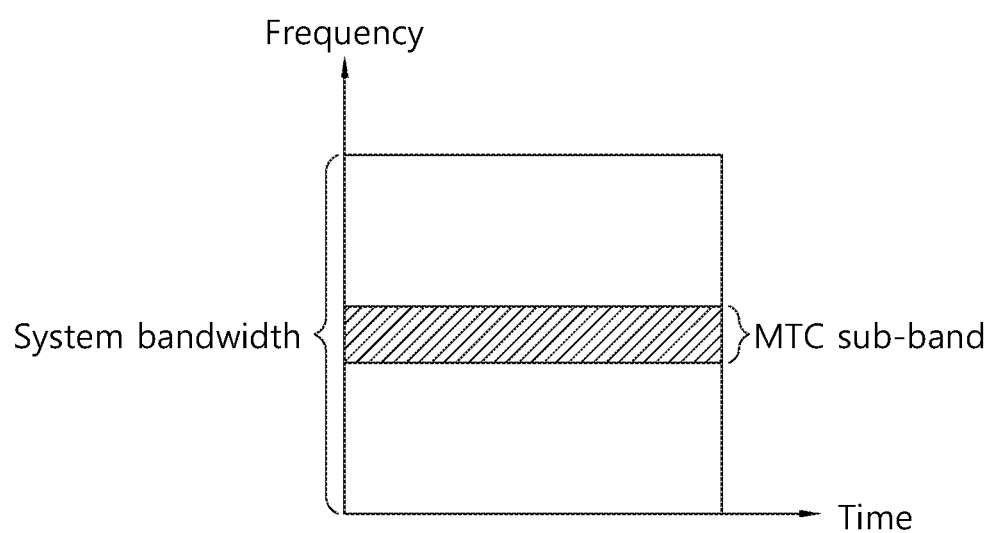
FIGS. 9a and 9b are exemplary diagrams illustrating an example of a sub-band in which an MTC apparatus is operated.
Figure 9B:
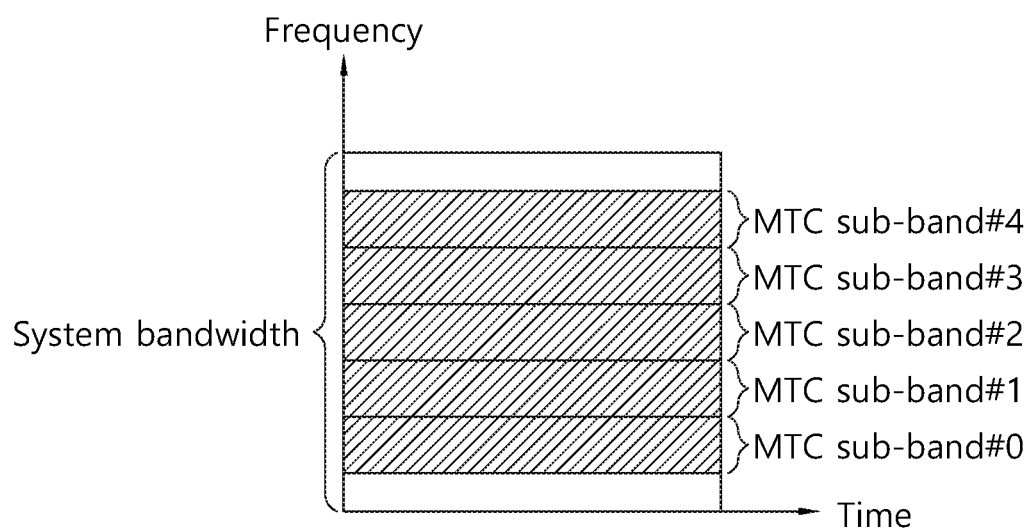

FIGS. 9a and 9b are exemplary diagrams illustrating an example of a sub-band in which an MTC apparatus is operated.

As a way for decreasing the costs of an MTC apparatus, the MTC apparatus may use a sub-band, for example, about 1.4 MHz, irrespective of a system bandwidth of a cell, as shown in FIG. 9a.

In this case, the region of the sub-band in which such an MTC apparatus operates may be, as shown in FIG. 9a, in the center region (e.g., 6 PRBs in the center) of the system band width of the cell.

Otherwise, as shown in FIG. 9b, for the multiplexing among the MTC apparatuses within a subframe, the MTC apparatuses may use different sub-bands, respectively, by placing several sub-bands in a subframe. In this case, the majority of the MTC apparatuses may use other sub-bands, not in the center region (e.g., 6 PRBs in the center) of the system band width of the cell.

However, in the center region (e.g., 6 PRBs in the center) of the system band width of the cell, a cell-common channel/signal is transmitted.

Accordingly, in the case that the region of the sub-band in which an MTC apparatus operates is not the center region (e.g., 6 PRBs in the center) of the system band of a cell, a problem occurs that the MTC apparatus fails to receive the cell-common channel/signal.

<Disclosures of the Present Specification>

Accordingly, a disclosure of the present specification is with the purpose of proposing a way to solve the problem.

Particularly, in order to solve the problem described above, as a way to solve the problem described above, a disclosure of the present specification proposes a way for the MTC apparatus to switch from its sub-band to the center region, in the case that the region of the sub-band in which the MTC apparatus operates is not the center region (e.g., 6 PRBs in the center) of the system band of a cell, as occasion demands.

More particularly, in the case that a low-cost MTC apparatus operates in the sub-band region which is not located in the center region (e.g., 6 PRBs in the center) of the system band of a cell, a disclosure of the present specification proposes the operation of the MTC apparatus to change its own sub-band region as occasion demands, and the operation of the MTC apparatus considering an RF re-tuning that occurs when the MTC apparatus changes the sub-band region.

Hereinafter, a disclosure of the present specification will be described by dividing each section.

I. Switching Between Sub-Bands for a Cell-Common Sub-Band and the Downlink for Each MTC Apparatus I-1. Definition of the Sub-Band for Each MTC Apparatus and the Cell-Common Sub-Band In this section, for the downlink operation of a specific MTC apparatus, it is proposed to define a sub-band specific for each MTC apparatus and a cell-common sub-band to the MTC apparatus.

Figure 10:
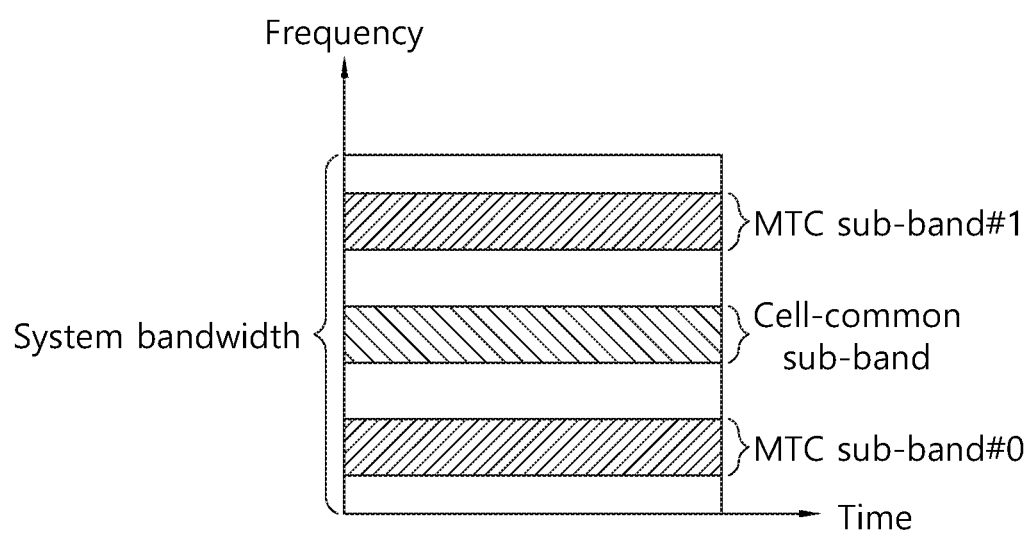
FIG. 10 is an exemplary diagram illustrating a location of a cell-common sub-band and a sub-band for each MTC apparatus.

FIG. 10 is an exemplary diagram illustrating a location of a cell-common sub-band and a sub-band for each MTC apparatus.

As it may be known with reference to FIG. 10, the location of a cell-common sub-band and a sub-band specific for each MTC apparatus may be defined among the system band of a cell.

On the sub-band specific for each MTC apparatus, the MTC apparatus may operate as follows.

The MTC apparatus may receive a specific PDCCH for each MTC apparatus or the PDCCH of a UE-specific Search Space (USS). That is, the MTC apparatus may assume that the USS region is existed only in the sub-band specific for each MTC apparatus. Or, the MTC apparatus may perform/try monitoring of the USS region only in the sub-band specific for each MTC apparatus.

The MTC apparatus may receive a specific PDSCH for each MTC apparatus (or a PDSCH scheduled by a PDCCH which is scrambled by C-RNTI).

Meanwhile, the MTC apparatus may perform the following operation on the cell-common sub-band.

The MTC apparatus may receive a PSS/SSS.

The MTC apparatus may receive a PBCH.

The MTC apparatus may receive a cell-common PDCCH or a PDCCH of a Cell-specific Search Space (CSS). That is, the MTC apparatus may assume that the CSS region is existed only in the cell-common sub-band. Or, the MTC apparatus may perform/try monitoring of the CSS region only in the cell-common sub-band.

The MTC apparatus may receive a cell-common PDSCH (or a PDSCH scheduled by a PDCCH which is scrambled by S-RNTI, P-RNTI and/or RA-RNTI). That is, the MTC apparatus may assume that an SIB (and/or a random access response (RAR), a paging message) is transmitted only in the cell-common sub-band.

So far, the operation of the MTC apparatus is described differently in the sub-band specific for each MTC apparatus and the cell-common sub-band, but it is understood that the MTC apparatus may perform the operation in the cell-common sub-band through the sub-band specific for each MTC apparatus, or the operation in sub-band specific for each MTC apparatus through the cell-common sub-band.

Meanwhile, even though the sub-band region used by the MTC apparatus is not divided into the sub-band specific for each MTC apparatus and the cell-common sub-band as mentioned above, the description above may be applied to the sub-band used by the MTC apparatus.

Meanwhile, the cell-common sub-band may be the center region (e.g., the region including 6 PRBs in the center) of the system band of a cell. Accordingly, the MTC apparatus may assume that the region including 6 PRBs in the center is the cell-common sub-band.

On the other hand, the sub-band specific for each MTC apparatus may be determined by a configuration of a BS (e.g., eNodeB). Such a sub-band specific for each MTC apparatus may be configured in a cell-common manner or a specific manner for each MTC apparatus. Such a configuration may be forwarded to the MTC apparatus from the BS through a system information block (SIB) or a high layer signaling. For example, in the case that a location of the sub-band specific for each MTC apparatus is configured to the MTC apparatus through the high layer signaling, it may be assumed that the sub-band specific for each MTC apparatus is the same as the location of the cell-common sub-band or the region including 6 PRBs in the center until the MTC apparatus receives a separate configuration after performing an initial access to the cell.

I-2. The Frequency Switching Between a Cell-Common Sub-Band and a Sub-Band Specific for Each MTC Apparatus The MTC apparatus that operates in the sub-band specific for each MTC apparatus may not operate only in the sub-band specific for each MTC apparatus continuously, but should perform the reception of a Primary Synchronization Signal (PSS), a Secondary Synchronization Signal (SSS), an SIB, a paging message, and so on by being switched to the cell-common sub-band intermittently.

Figure 11:
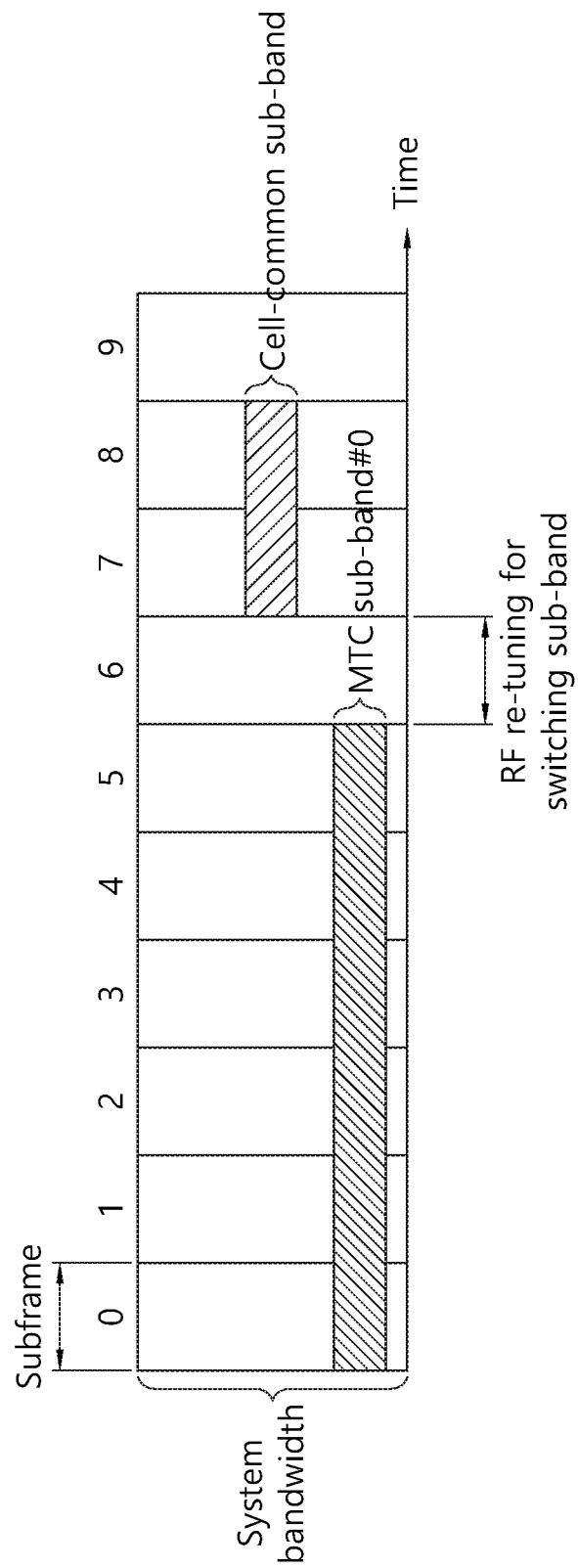
FIG. 11 illustrates an example of switching from a sub-band for each MTC apparatus to a cell-common sub-band.

FIG. 11 illustrates an example of switching from a sub-band for each MTC apparatus to a cell-common sub-band.

As it may be known with reference to FIG. 11, an example for an MTC apparatus that operates in the sub-band specific for each MTC apparatus to switch to the cell-common sub-band is shown. The switching may be performed during the time required for an RF re-tuning as shown in FIG. 11. After switching to the cell-common sub-band, the MTC apparatus may receive a signal/channel in the cell-common sub-band.

Hereinafter, the configuration according to the way below is proposed for an MTC apparatus to switch from the sub-band specific for each MTC apparatus to the cell-common sub-band.

(1) A First Method: Gap Configuration by a High Layer

A BS may forward the configuration for the subframe/timing for monitoring the cell-common sub-band (i.e., subframe configuration for cell-common sub-band monitoring) to an MTC apparatus. This will be described with reference to FIG. 12a.

Figure 12A:
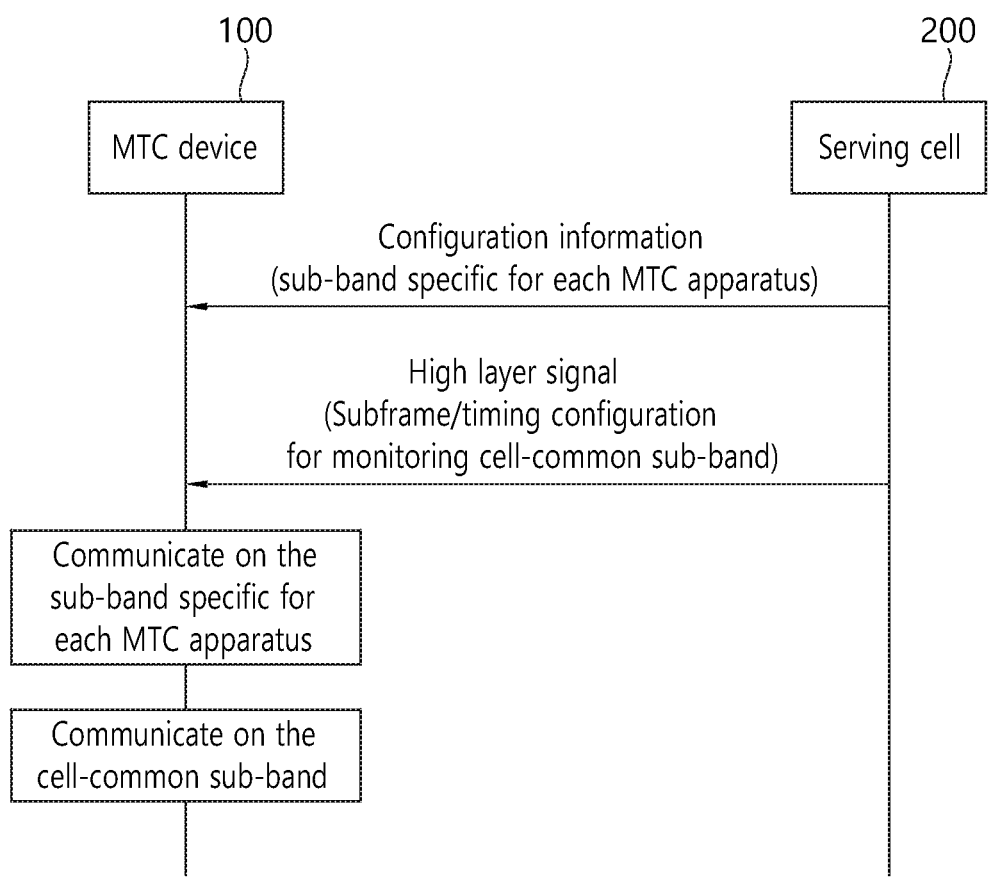
FIG. 12a is an exemplary diagram illustrating a procedure of receiving the configuration for the subframe/timing for monitoring the cell-common sub-band.

FIG. 12a is an exemplary diagram illustrating a procedure of receiving the configuration for the subframe/timing for monitoring the cell-common sub-band.

As it may be known with reference to FIG. 12a, firstly, an MTC apparatus 100 receives the configuration information for the sub-band specific for each MTC apparatus from a serving cell 200 of a BS. In this case, the configuration information may also include the configuration information for the cell-common sub-band. Alternatively, even in the case of not receiving the configuration information for the cell-common sub-band, the MTC apparatus may assume that the cell-common sub-band is located at the center among the system band of the serving cell.

Meanwhile, the MTC apparatus 100 may receive the subframe/timing configuration information for monitoring the cell-common sub-band through a high layer signaling.

The MTC apparatus that receives such a configuration may stop the operation (e.g., reception of a signal/channel) required in the sub-band specific for each MTC apparatus in the corresponding subframe region, and may perform the operation (e.g., reception of a signal/channel) in the cell-common sub-band by changing its own operation sub-band to the cell-common sub-band.

In this case, the configuration for the subframe in which the cell-common sub-band monitoring is going to be performed may include one or more of the following parameters.

Duration: This means a duration that includes one or more subframes for monitoring the cell-common sub-band. The value of the duration may be determined by the BS by considering/including the RF re-tuning time required for the MTC apparatus to perform switching.

Period: This means a period represented by the subframes in which the cell-common sub-band is going to be monitored. In every corresponding period, the subframes are existed for monitoring the cell-common sub-band during the duration.

Offset: This is an offset value for configuring the location of the subframe in which the cell-common sub-band is going to be monitored.

In the case that the MTC apparatus performs a (E)PDCCH monitoring during the time that does not correspond to the subframe/timing for monitoring the cell-common sub-band (and in the case that the sub-band specific for each MTC apparatus is configured and/or in the case that DRX is not configured for the MTC apparatus), the MTC apparatus performs the operation (e.g., of a signal/channel) required in the sub-band specific for each MTC apparatus. In addition, while the MTC apparatus monitors the CSS in the cell-common sub-band, the MTC apparatus may perform the (E)PDCCH monitoring in the USS by assuming that the USS is also existed in the cell-common sub-band.

(2) A Second Method: Subframe Set Configuration by a High Layer

A BS may forward the configuration for a subset of the subframe(s) for receiving the cell-common sub-band to an MTC apparatus. This will be described with reference to FIG. 12b.

Figure 12B:
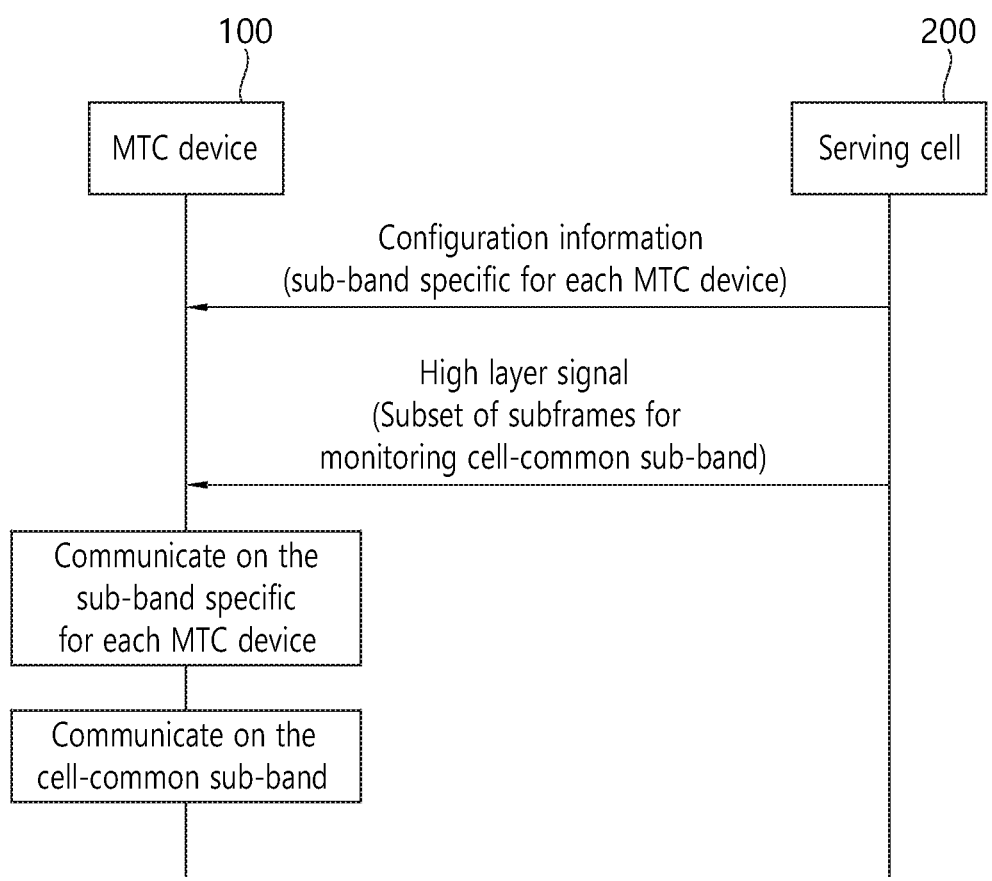
FIG. 12b is an exemplary diagram illustrating a procedure of receiving the subset of the subframes for monitoring the cell-common sub-band.

FIG. 12b is an exemplary diagram illustrating a procedure of receiving the subset of the subframes for monitoring the cell-common sub-band.

As it may be known with reference to FIG. 12b, firstly, an MTC apparatus 100 receives the configuration information for the sub-band specific for each MTC apparatus from a serving cell 200 of a BS. In this case, the configuration information may also include the configuration information for the cell-common sub-band. Alternatively, even in the case of not receiving the configuration information for the cell-common sub-band, the MTC apparatus may assume that the cell-common sub-band is located at the center among the system band of the serving cell.

Meanwhile, the MTC apparatus 100 may receive the configuration for the subset of the subframes for monitoring the cell-common sub-band through a high layer signaling.

The MTC apparatus that receives such a configuration may perform the operation (e.g., reception of a signal/channel) required in the cell-common sub-band in the corresponding subframe region.

In this case, a predetermined time of RF re-tuning time may be required for the MTC apparatus to switch from the sub-band specific for each MTC apparatus to the cell-common sub-band. In this case, the MTC apparatus may perform the RF re-tuning from the sub-band specific for each MTC apparatus to the cell-common sub-band through the following methods.

Not receiving a part of the last OFDM symbol(s) (or the whole OFDM symbols) of the previous subframe of the subframe duration for monitoring the cell-common sub-band, the MTC apparatus may perform switching to a target sub-band during the corresponding duration. That is, for example, in the case that subframes #n to #n+5 are the subframes for monitoring the cell-common sub-band, the MTC apparatus may perform switching to the target sub-band in the corresponding duration, not receiving a part of the last OFDM symbol(s) (or the whole OFDM symbols) of subframe #n−1.

Not receiving a part of the front OFDM symbol(s) (or the whole OFDM symbols) of the starting subframe of the subframe duration for monitoring the cell-common sub-band, the MTC apparatus may perform switching to a target sub-band during the corresponding duration. That is, for example, in the case that subframes #n to #n+5 are the subframes for monitoring the cell-common sub-band, the MTC apparatus may perform switching to the target sub-band in the corresponding duration, not receiving a part of the front OFDM symbol(s) (or the whole OFDM symbols) of subframe #n.

In addition, the MTC apparatus may perform the RF re-tuning from the sub-band specific for each MTC apparatus to the cell-common sub-band through the following methods.

Not receiving a part of the front OFDM symbol(s) (or the whole OFDM symbols) of the next subframe of the subframe duration for monitoring the cell-common sub-band, the MTC apparatus may perform switching to a target sub-band during the corresponding duration. That is, for example, in the case that subframes #n to #n+5 are the subframes for monitoring the cell-common sub-band, the MTC apparatus may perform switching to the target sub-band in the corresponding duration, not receiving a part of the front OFDM symbol(s) (or the whole OFDM symbols) of subframe #n+6.

Not receiving a part of the last OFDM symbol(s) (or the whole OFDM symbols) of the last subframe of the subframe duration for monitoring the cell-common sub-band, the MTC apparatus may perform switching to a target sub-band during the corresponding duration. That is, for example, in the case that subframes #n to #n+5 are the subframes for monitoring the cell-common sub-band, the MTC apparatus may perform switching to the target sub-band in the corresponding duration, not receiving a part of the last OFDM symbol(s) (or the whole OFDM symbols) of subframe #n+5.

In this case, while the MTC apparatus monitors the CSS sub-band, the MTC apparatus may perform the (E)PDCCH monitoring in the USS by assuming that the USS is also existed in the cell-common sub-band.

(3) A Third Method: Subframe Configuration for Monitoring an EPDCCH on a CSS by a High Layer A BS may forward the configuration for a subframe for monitoring receiving an EPDCCH on a CSS to an MTC apparatus. In this case, the MTC apparatus may perform the operation (e.g., reception of a signal/channel) required in the cell-common sub-band in the corresponding subframe region, and may also perform monitoring the EPDCCH on the CSS.

This will be described with reference to FIG. 12c.

Figure 12C:
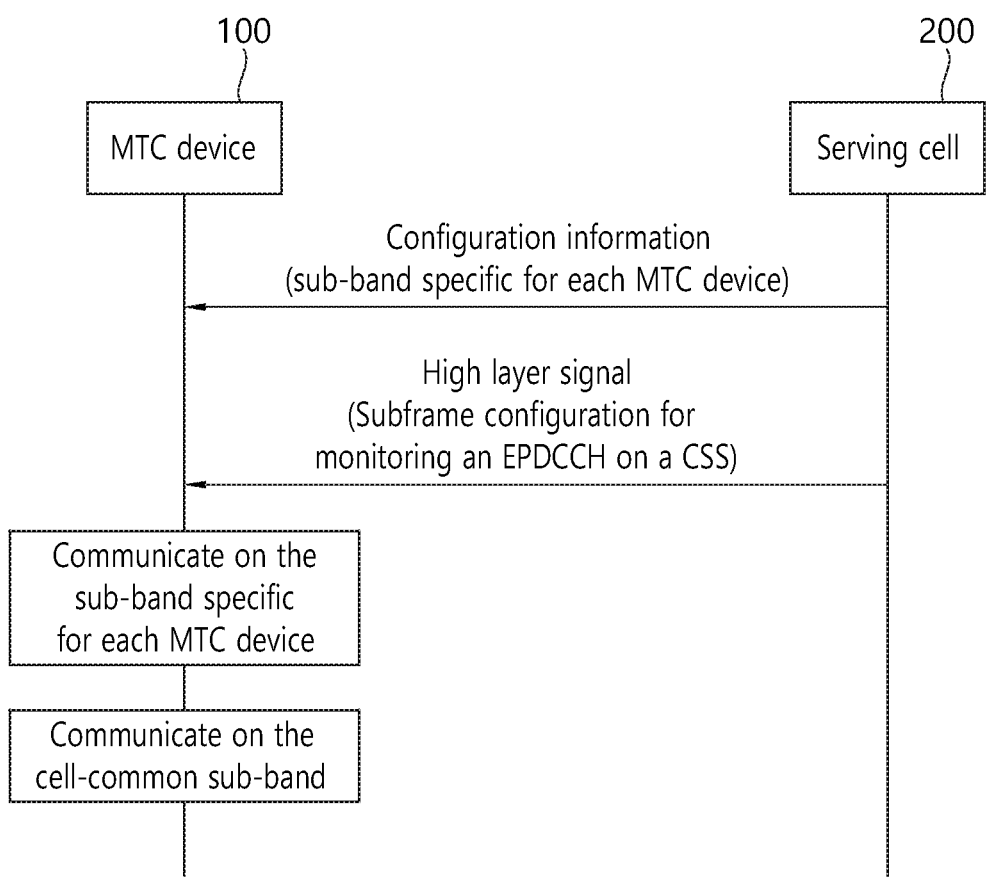
FIG. 12c is an exemplary diagram illustrating a procedure of receiving the configuration for the subframe for monitoring the EPDCCH on the CSS.

FIG. 12c is an exemplary diagram illustrating a procedure of receiving the configuration for the subframe for monitoring the EPDCCH on the CSS.

As it may be known with reference to FIG. 12c, firstly, an MTC apparatus 100 receives the configuration information for the sub-band specific for each MTC apparatus from a serving cell 200 of a BS. In this case, the configuration information may also include the configuration information for the cell-common sub-band. Alternatively, even in the case of not receiving the configuration information for the cell-common sub-band, the MTC apparatus may assume that the cell-common sub-band is located at the center among the system band of the serving cell.

Meanwhile, the MTC apparatus 100 may receive the configuration for the subframe for monitoring the EPDCCH through a high layer signaling.

Then, the MTC apparatus 100 may perform the operation (e.g., reception of a signal/channel) required in the cell-common sub-band in the corresponding subframe region, and may also perform monitoring the EPDDCH on the CSS.

In this case, while the MTC apparatus monitors the CSS in the cell-common sub-band, the MTC apparatus may perform the (E)PDCCH monitoring in the USS by assuming that the USS is also existed in the cell-common sub-band.

(4) A Fourth Method: Configuration for Subframe #0 and #5

An MTC apparatus may perform monitoring the cell-common sub-band in subframe #0 and #5 unconditionally. In this case, while the MTC apparatus monitors the CSS in the cell-common sub-band, the MTC apparatus may perform the (E)PDCCH monitoring in the USS by assuming that the USS is also existed in the cell-common sub-band.

(5) A Fifth Method: An Autonomous Gap by an MTC Apparatus

Even in the case of not receiving a configuration from a BS, an MTC apparatus may perform switching to the cell-common sub-band when it is needed, and then, may perform the operation (e.g., reception of a signal/channel) required in the cell-common sub-band. In this case, the MTC apparatus may notify the subframe/timing (e.g., subframe for monitoring the cell-common sub-band) used for monitoring the cell-common sub-band to a BS through an RRC signaling. In this case, the MTC apparatus may perform re-tuning an RF for switching to a target sub-band during a gap duration notified by the MTC apparatus itself to the BS. That is, in the case that the MTC apparatus performs the (E)PDCCH monitoring in the duration except the gap duration (and in the case that the sub-band specific for each MTC apparatus is configured and/or in the case that a DRX is not configured for the MTC apparatus), the MTC apparatus performs the operation (e.g., reception of a signal/channel) required in the sub-band specific for each MTC apparatus. In addition, while the MTC apparatus monitors the CSS in the cell-common sub-band, the MTC apparatus may perform the (E)PDCCH monitoring in the USS by assuming that the USS is also existed in the cell-common sub-band.

II. Switching for a Sub-Band Specific for Each MTC Apparatus

The sub-band specific for each MTC apparatus may be changed dynamically or semi-statically by the configuration of a BS. This may be following the channel environment different between sub-bands or done for obtaining the frequency diversity effect. The following description may be applied when the MTC apparatus implemented with low-complexity is to switch sub-bands, but may also be applied to the case of hopping a sub-band in a unit of a subframe or hopping the sub-band in a unit of several subframes in order to give the frequency diversity effect to the channels that are repeatedly transmitted on several subframes.

In this case, when the MTC apparatus receives the configuration for switching the sub-band of the MTC apparatus itself to another sub-band in subframe n, the MTC apparatus may perform switching to a target sub-band through the following way considering the time for RF re-tuning for switching to the target sub-band. The description below will be described based on the sub-band specific for each MTC apparatus, but may also be applied to the cell-common sub-band. In addition, the description below may be identically applied to an uplink sub-band as well as a downlink sub-band. Among the description below, the content of receiving/not receiving a symbol or a subframe may be changed to the meaning of transmitting/not transmitting a symbol or a subframe.

(1) A First Exemplary Method

As a first exemplary method, when an MTC apparatus performs switching to a target sub-band in subframe n, the MTC apparatus may perform switching to the target sub-band in a corresponding duration by not reading a part of the front symbols of subframe n. Since the region including a part of the front symbols is the region where a BS transmits an existing PDCCH in a downlink environment, generally, the MTC apparatus is not required to perform a reception on the part of the front symbol. This will be described with reference to FIG. 13.

Figure 13:
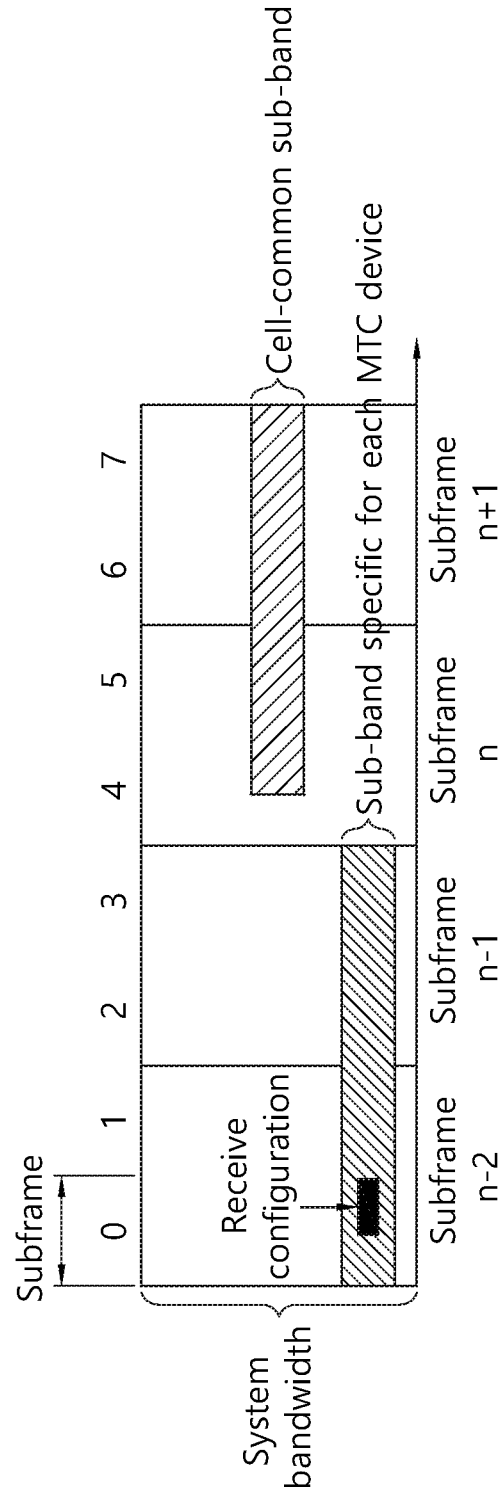
FIG. 13 illustrates an example of performing switching to a target sub-band in subframe n.

FIG. 13 illustrates an example of performing switching to a target sub-band in subframe n.

As it may be known from FIG. 13, in the situation that an MTC apparatus operates on the sub-band specific for each MTC apparatus, the MTC apparatus receives the configuration for switching to the cell-common sub-band in subframe n, for example, on subframe n−2.

Then, the MTC apparatus may perform switching to the cell-common sub-band in duration of the front part by not reading in the corresponding duration of the front part (e.g., a part of symbols of the front part).

(2) A Second Exemplary Method

As a second exemplary method, when an MTC apparatus performs switching to a target sub-band in subframe n, the MTC apparatus may perform switching to the target sub-band in a corresponding duration by not reading a part of the last symbols of subframe n−1.

(3) A Third Exemplary Method

As a third exemplary method, when an MTC apparatus performs switching to a target sub-band in subframe n, the MTC apparatus may perform switching to the target sub-band in a corresponding duration by not reading subframe n.

(4) A Fourth Exemplary Method

As a fourth exemplary method, when an MTC apparatus performs switching to a target sub-band in subframe n, the MTC apparatus may perform switching to the target sub-band in a corresponding duration by not reading subframe n−1.

(5) A Fifth Exemplary Method

As a fifth exemplary method, when an MTC apparatus performs switching to a target sub-band in subframe n, the MTC apparatus may perform switching to the target sub-band in a corresponding duration by not reading the second slot (odd slot) of subframe n−1.

(6) A Sixth Exemplary Method

As a sixth exemplary method, the MTC apparatus may perform switching to the target sub-band in a corresponding duration by not reading the first slot (even slot) of subframe n.

Meanwhile, since an MTC apparatus is unable to operate in the while system band but operates on the part of sub-band only, the MTC apparatus is unable to properly receive the existing PDCCH transmitted by a BS on the while system band.

Accordingly, a disclosure of the present specification proposes a new downlink control channel transmitted on a part of sub-band, not on the whole system band of a cell. Such a new downlink control channel is referred to as an MTC-(E)PDCCH or an M-(e)PDCCH.

Meanwhile, the transmission time position of the (E)PDCCH (i.e., MTC-PDCCH) for the MTC apparatus that operates on a part of sub-band, not on the whole system band of a cell may be determined by considering the RF re-tuning time of the MTC apparatus. For example, like in the first exemplary method above, by considering that the MTC apparatus performs switching to a target sub-band, the MTC-PDCCH may be arranged such that a transmission of the MTC-PDCCH is started in the second slot always, or may be arranged in a direction that an OFDM symbol index decreases from the last symbol. Otherwise, like the first exemplary method or the second exemplary method above, when the MTC apparatus performs switching to the target sub-band, the MTC apparatus may assume that the (E)PDCCH/PDSCH is not transmitted to the MTC apparatus itself in the subframe location for performing switching to the target sub-band.

In addition, like the first exemplary method or the second exemplary method above, when the MTC apparatus performs switching to the target sub-band, the MTC apparatus may not receive a PDSCH in a subframe in which a part of subframe is not received for switching to the target sub-band. That is, in the subframe in which a guard duration for switching to the target sub-band is existed, the MTC apparatus may receive the MTC-PDCCH only, but may not receive the PDSCH. In addition, in the case that a BS transmits a DL grant through the MTC-PDCCH and the PDSCH is transmitted in the subframe in which the DL grant is transmitted, the MTC apparatus may assume that the DL grant received in the subframe in which the guard duration for switching to the target sub-band is existed is not valid.

Meanwhile, a unit of time when the sub-band specific for each MTC apparatus is changed may be determined by considering the RF re-tuning time of an MTC apparatus. For example, in the case that the re-tuning time required for an MTC apparatus is 1 msec, it may not be preferable to change a sub-band in every one subframe. Accordingly, it is proposed that the unit of time when a sub-band is changed is at least two subframes. That is, for example, the hopping pattern of the sub-band specific for each MTC apparatus used by an MTC apparatus may be a unit of two subframes (or a unit of more than two subframes). This may also be applied to the case that the frequency region (i.e., sub-band) for transmitting a PDSCH/PUSCH, and the like, which is repeatedly transmitted on several subframes, is changed in every subframe. The hopping pattern of a frequency aspect in which the frequency region (i.e., sub-band) such as a PDSCH/PUSCH, and the like is changed may be implemented in a unit of two subframes (or a unit of more than two subframes) by considering the RF re-tuning time of an MTC apparatus.

For this, characteristically, a BS may configure the unit of time (a unit of subframe) when the hopping pattern of a frequency aspect is applied to an MTC apparatus through a high layer signaling. In this case, the unit of time when the hopping pattern is applied may be changed depending on the value configured by the BS. For example, in the case that the unit of time when the hopping pattern indicated by the BS is applied is a unit of three subframes, the MTC apparatus may apply the given hopping pattern in a unit of three subframes. Otherwise, in the case that the unit of time when the hopping pattern indicated by the BS is applied is a unit of five subframes, the MTC apparatus may apply the given hopping pattern in a unit of five subframes.

Meanwhile, for the coverage extension, a BS may repeatedly transmit an EPDCCH/PDCCH on a plurality of subframes (e.g., three subframes). As such, the repeated transmission of the EPDCCH/PDCCH on several subframes may be referred to as a bundle transmission of the EPDCCH/PDCCH. Similarly, the MTC apparatus that requires the coverage extension may repeatedly transmit a PUCCH/PUSCH on a plurality of subframes (e.g., three subframes). As such, the repeated transmission of the PUCCH/PUSCH on several subframes may be referred to as a bundle transmission.

In such a bundle transmission technique, it is proposed to perform the RF re-tuning for an MTC apparatus to perform hopping a sub-band for receiving an EPDCCH/PDCCH in a unit of N subframes (e.g., three subframes), and not to transmit/receive an EPDCCH/PDCCH in subframe #k (or subframe #k−1) when the position of the sub-band is changed in subframe #k. In the case of downlink, the MTC apparatus may assume that the EPDCCH/PDCCH is not transmitted to the MTC apparatus itself in subframe #k (or subframe #k−1). In addition, it may be assumed that the MTC apparatus does not transmit a PUSCH in subframe #k (or subframe #k−1). In other words, the MTC apparatus may assume that subframe #k (or subframe #k−1) for performing the RF re-tuning is excluded from the subframe in which an EPDCCH/PDSCH/PUSCH is repeatedly transmitted. Accordingly, the MTC apparatus may exclude the subframe in which an EPDCCH/PDSCH is not received (subframe in which a PUSCH is not transmitted) from the count of the number of an EPDCCH/PDSCH (PUSCH) being repeated. This will be described with reference to FIG. 14.

Figure 14:
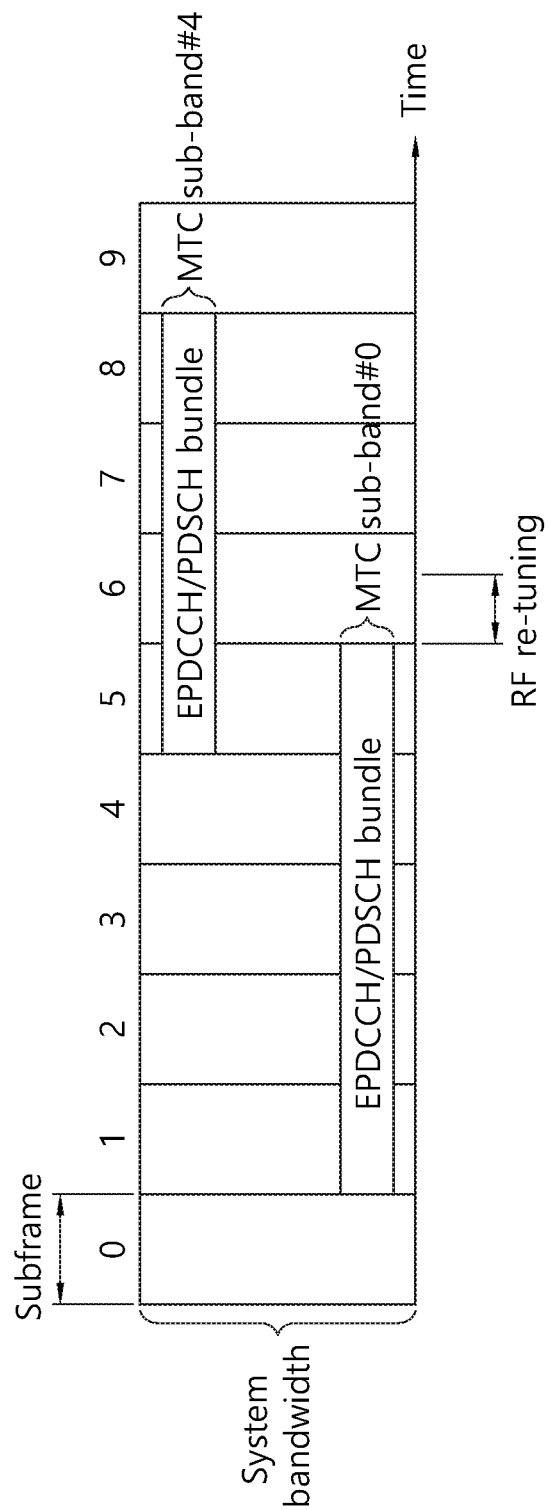
FIG. 14 illustrates an example that a sub-band in which a bundle of EPDCCH/PDSCH is received.

FIG. 14 illustrates an example that a sub-band in which a bundle of EPDCCH/PDSCH is received.

As it may be known with reference to FIG. 14, the position of the sub-band in which a bundle of EPDCCH/PDSCH is repeated N times (e.g., 4 times) may be hopping on subframe k (e.g., subframe 5). As a simple description, a shown in FIG. 14, the position of the sub-band in which a bundle of EPDCCH/PDSCH is repeated on four subframes may be hopping on subframe 5. More particularly, the MTC apparatus may receive a bundle of EPDCCH/PDSCH which is repeated four times from subframe 5 to subframe 8 in MTC sub-band #0, and may receive a bundle of EPDCCH/PDSCH which is repeated four times from subframe 1 to subframe 4 in MTC sub-band #4. In this case, the MTC apparatus performs the RF re-tuning for switching from MTC sub-band #0 to MTC sub-band #4 in subframe 5. During performing the RF re-tuning, the MTC apparatus may not receive the bundle of EPDCCH/PDSCH. In this case, as described above, the MTC apparatus may exclude the subframe 5 in which an EPDCCH/PDSCH is not received from the count of the number of an EPDCCH/PDSCH (PUSCH) being repeated. That is, although a BS transmits the bundle of EPDCCH/PDSCH which is repeated four times from subframe 5 to subframe 8, the MTC apparatus does not receive the EPDCCH/PDSCH in subframe 5. Accordingly, the MTC apparatus excludes subframe 5, and regards that the bundle of EPDCCH/PDSCH is repeated three times.

Meanwhile, it is proposed that the subframe position for performing hopping of a sub-band is different for each MTC apparatus or a group of MTC apparatuses. For example, the hopping of a sub-band specific for each MTC apparatus is performed in a unit of N subframes. And when N groups of MTC apparatuses are existed, in the case of group #n of MTC apparatuses may perform the hopping of a sub-band on the subframe position in which the value of subframe index mod N is n. For another example, a specific MTC apparatus may perform the hopping of a sub-band on the subframe position in which the value of an MTC apparatus ID mod N is n. As such, in the case that the time of hopping pattern being set is differently configured for each MTC apparatus or a group of MTC apparatus, there is an advantage that the subframe position in which scheduling for all MTC apparatuses (or MTC apparatus that requires the coverage extension) for the RF re-tuning is failed does not occur.

Figure 15A:
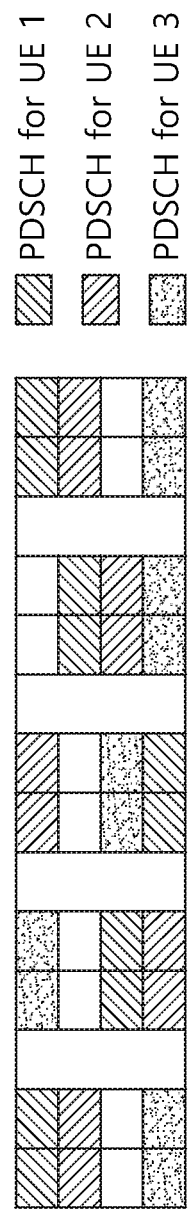
FIGS. 15a and 15b are exemplary diagrams illustrating a hopping pattern of a sub-band.
Figure 15B:
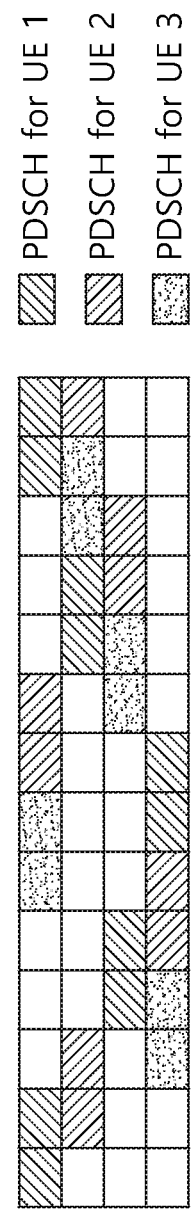

FIGS. 15a and 15b are exemplary diagrams illustrating a hopping pattern of a sub-band.

As shown in FIG. 15a, when N=3, in the case that the hopping of the sub-band for a PDSCH is performed on the same time for all MTC apparatuses, the subframe is existed, in which a PDSCH is unable to be transmitted to all MTC apparatuses one by three subframes. On the contrary, as shown in FIG. 15b, by differently configuring the time (using an offset value) for performing the hopping of the sub-band for a PDSCH for each MTC apparatus (or a group of MTC apparatuses), the subframe in which a PDSCH is unable to be transmitted to all MTC apparatuses is not existed.

Meanwhile, when MTC apparatuses perform the hopping of a sub-band on different times, the case may occur that the sub-band is collided between the MTC apparatuses. This will be described with reference to FIG. 14.

Figure 16:
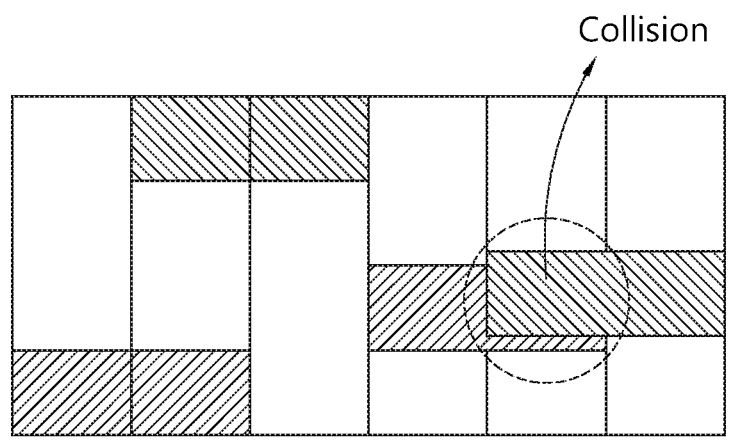
FIG. 16 is an exemplary diagram illustrating the problem occurred when MTC apparatuses perform the hopping of a sub-band on different times.

FIG. 16 is an exemplary diagram illustrating the problem occurred when MTC apparatuses perform the hopping of a sub-band on different times.

As shown in FIG. 16, in the case that MTC apparatuses performing the hopping of a sub-band on different times, a problem may occur that a position of an EPDCCH/PDSCH/PUSCH transmission resource collides.

In order to prevent such a problem, it is proposed to configure the N value, which is a unit of performing the hopping of a sub-band, as 2 always. That is, the hopping of a sub-band is performed in a unit of two subframes, and an MTC apparatus may use the front subframe (or the last subframe) among two subframes in which the same sub-band resource is maintained for the RF re-tuning.

In this case, the hopping of a sub-band may be interpreted as the hopping of a sub-band (frequency) position in which an EPDCCH/PDSCH/PUSCH is transmitted to an MTC apparatus.

As mentioned above, the sub-band specific for each MTC apparatus of an MTC apparatus may be changed dynamically or half-statically according to a configuration of a BS. For example, a BS may notify a position of the sub-band specific for each MTC apparatus for receiving/transmitting a PDSCH and/or a PUSCH through a DCI in order for the BS to configure dynamically the position of the sub-band specific for each MTC apparatus. This may also be applied for a transmission of a cell-common PDSCH. In this case, a field for notifying the position of the sub-band for receiving/transmitting a PDSCH and/or a PUSCH may be included in the DCI. However, in the case that a size of system band of a cell is small and the number of sub-bands existed in the cell is small (e.g., system band is 1.4 MHz and only one sub-band is existed), the field for notifying the position of the sub-band in the DCI may be meaningless.

Considering such a case, the corresponding field may be used for multiplexing to time domain as well as the frequency domain of the MTC apparatus. That is, the specific field in the DCI may be used for notifying the information of the frequency position (i.e., a position of a sub-band) on which the MTC apparatus receives a PDSCH or transmits a PUSCH and/or the information of the time position (e.g., a subframe position).

In addition, in the case that the number of sub-bands that a cell is able to provide among the system band is a specific number or more or in the case that the size of the system band of the cell is a specific value or more, the field may be used for notifying the information of the position (i.e., frequency position) of the sub-band for the MTC apparatus to receive a PDSCH or transmit a PUSCH. In the case that the number of sub-bands that a cell is able to provide among the system band is less than a specific number or in the case that the size of the system band of the cell is smaller than a specific value, the field may be used for notifying the information of the time position (i.e., subframe position) for the MTC apparatus to receive a PDSCH or transmit a PUSCH.

Otherwise, in the case that the number of sub-bands (configured as the sub-band that the MTC apparatus is able to use from a BS) that the MTC apparatus is able to use in the corresponding cell is more than a specific number, the field may be used for notifying the information of the position (i.e., frequency position) of the sub-band for the MTC apparatus to receive a PDSCH or transmit a PUSCH. However, in the case that the number of sub-bands that the MTC apparatus is able to use in the corresponding cell is less than a specific number, the field may be used for notifying the information of the time position (i.e., subframe position) for the MTC apparatus to receive a PDSCH or transmit a PUSCH.

In this case, the information of the time position (i.e., subframe position) for the MTC apparatus to receive a PDSCH or transmit a PUSCH may be as follows, for example.

The time position (i.e., subframe position) for the MTC apparatus to start a reception of a PDSCH or a transmission of a PUSCH The index (or a position of the starting subframe and a duration of the subframe) for a position of a subframe bundle for the MTC apparatus to receive a PDSCH or transmit a PUSCH As described above, as a method for notifying the information of the frequency position (i.e., position of a sub-band) for the MTC apparatus to receive a PDSCH or transmit a PUSCH and/or the information of the time position (i.e., subframe position), for example, the following method may be considered. For example, by using the field that has M-number of bits (e.g., two-number of bits) in a DCI, the MTC apparatus notifies the information of the frequency position (i.e., position of a sub-band) to receive a PDSCH or transmit a PUSCH and/or the information of the time position (i.e., subframe position), but the information of the frequency position (i.e., position of a sub-band) and/or the time position (i.e., subframe position) indicated (meant) may be semi-statically configured by a SIB or an RRC from the BS to the MTC apparatus. For example, the specific value in the DCI field may indicate the following contents.

A position of a sub-band and/or a subframe configured by a high layer signaling
  The position of the sub-band is identical to the sub-band position for (E)PDCCH repetition, and the subframe position is configured by a high layer signaling.
  The position of the sub-band is identical to the sub-band position for (E)PDCCH repetition, and the subframe position is the first subframe position among several subframes.
  The position of the sub-band is the sub-band position configured by a high layer signaling, and the subframe position is the first subframe position among several subframes.

The contents that each value of the fields of the length of M-bits (e.g., 2 bits) in a DCI may be decided by the combination of such contents. For example, the contents that each value of the fields of the length of M-bits (e.g., 2 bits) in a DCI may be as represented in Table 3 and Table 4.

TABLE 3

| Field value | Description |
|---|---|
| 00 | Sub-band configured by a high layer signaling and/or a first position of subframe |
| 01 | Sub-band configured by a high layer signaling and/or a second position of subframe |
| 10 | Sub-band configured by a high layer signaling and/or a third position of subframe |
| 11 | Sub-band configured by a high layer signaling and/or a fourth position of subframe |

TABLE 4

| Field value | Description |
|---|---|
| 00 | Position of a sub-band is identical to the sub-band position for (E)PDCCH repetition, and a position of subframe is the first subframe among several subframes |
| 01 | Position of a sub-band is identical to the sub-band position for (E)PDCCH repetition, and a position of subframe is the subframe position configured by a high layer signaling |
| 10 | Sub-band configured by a high layer signaling and/or a first position of subframe |
| 11 | Sub-band configured by a high layer signaling and/or a second position of subframe |

III. Guard Subframe for TDD

In a TDD environment, a position of an operation sub-band of an MTC apparatus in a downlink subframe (and DwPTS duration) and a position of the operation sub-band of an MTC apparatus in an uplink (and UpPTS duration) may be changed.

Figure 17:
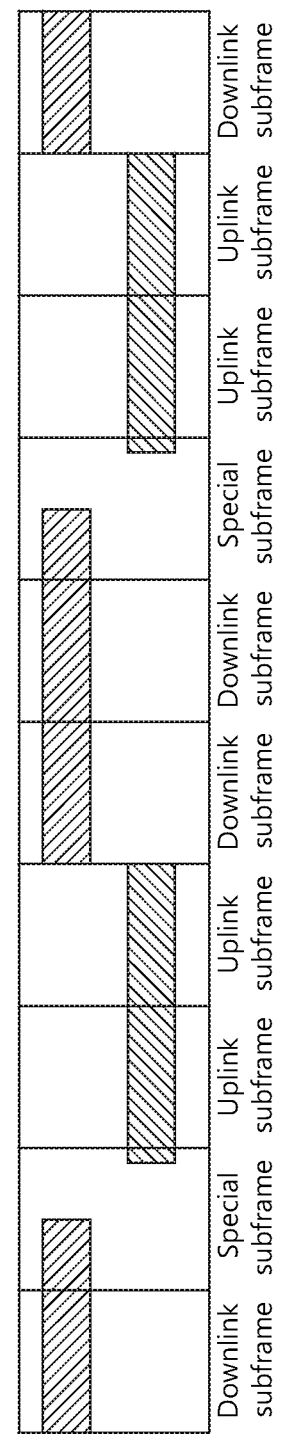
FIG. 17 illustrates an example that a sub-band position on a downlink subframe and a sub-band position on an uplink subframe are different in a TDD environment.

FIG. 17 illustrates an example that a sub-band position on a downlink subframe and a sub-band position on an uplink subframe are different in a TDD environment.

As shown in FIG. 17, a position of a sub-band in a downlink subframe (or DwPTS duration of a special subframe) and a position of a sub-band in an uplink subframe (or UpPTS duration of a special subframe) may be different.

In this case, similar to the operation in the Half duplex (HD)-FDD, a guard period of the maximum 1 msec may be required for an MTC apparatus to switch from the sub-band for downlink to the sub-band for uplink or switch from the sub-band for uplink to sub-band for downlink. That is, in the case of switching from the sub-band on a downlink subframe to the sub-band on an uplink subframe in a TDD environment and in the case of switching from the sub-band on an uplink subframe to the sub-band on a downlink subframe, a guard period (i.e., subframe including the guard period) of 1 msec (1 subframe) may be required.

In this case, the subframe position of the guard period may be determined according to the method for each of TDD UL/DL configuration.

(1) A First Method

The rule for determining a subframe of a guard period may be as follows.
  When switching from uplink to downlink, the downlink subframe located next to an uplink subframe is used for the subframe of the guard period.
  When switching from downlink to uplink, the special subframe previously located from an uplink subframe is used for the subframe of the guard period.

In this case, according to the TDD UL/DL configuration, the subframe (i.e., G) of the guard period may be existed in the subframe number position represented in Table below.

TABLE 5

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | G | G | U | U | U | G | G | U | U | U |
| 1 | D | G | U | U | D | D | G | U | U | G |
| 2 | D | G | U | D | D | D | G | U | G | D |
| 3 | D | G | U | U | U | G | D | D | D | D |
| 4 | D | G | U | U | G | D | D | D | D | D |
| 5 | D | G | U | G | D | D | D | D | D | D |
| 6 | D | G | U | U | U | G | G | U | U | G |

(2) A Second Method

The rule for determining a subframe of a guard period may be as follows.
  When switching from uplink to downlink, the uplink subframe previously located from a downlink subframe is used for the guard subframe.
  When switching from downlink to uplink, the special subframe previously located from an uplink subframe is used for the subframe of the guard period.

In this case, according to the TDD UL/DL configuration, the subframe (i.e., G) of the guard period may be existed in the subframe number position represented in Table below.

TABLE 6

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | G | U | U | G | D | G | U | U | G |
| 1 | D | G | U | G | D | D | G | U | G | D |
| 2 | D | G | U | D | D | D | G | G | D | D |
| 3 | D | G | U | U | U | G | D | D | D | D |
| 4 | D | G | U | G | D | D | D | D | D | D |
| 5 | D | G | G | D | D | D | D | D | D | D |
| 6 | D | G | U | U | G | D | G | U | G | D |

(3) A Third Method

The rule for determining a subframe of a guard period may be as follows.
  When switching from downlink to uplink, the special subframe previously located from an uplink subframe is used for the subframe of the guard period.
  When switching from uplink to downlink, the downlink subframe located next to an uplink subframe is used for the subframe of the guard period.

However, in the case that the downlink subframe used as the guard period subframe is located in subframes #0 and #5, the uplink subframe previously located from the corresponding downlink subframe is used for the subframe of the guard period.

However, in subframes #n to #n+3, in the case that the subframe is located in the order of uplink-downlink-special-unlink, the uplink subframe (i.e., subframe #n) previously located from a downlink subframe (i.e., subframe #n+1) is used for the subframe of the guard period.

In this case, according to the TDD UL/DL configuration, the subframe (i.e., G) of the guard period may be existed in the subframe number position represented in Table below.

TABLE 7

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | G | U | U | G | D | G | U | U | G |
| 1 | D | G | U | U | G | D | G | U | U | G |
| 2 | D | G | U | G | D | D | G | U | G | D |
| 3 | D | G | U | U | G | D | D | D | D | D |
| 4 | D | G | U | U | G | D | D | D | D | D |
| 5 | D | G | U | G | D | D | D | D | D | D |
| 6 | D | G | U | U | G | D | G | U | U | G |

However, in the case that an MTC apparatus is configured as TDD UL-DL configuration 1 or 6, it is proposed that the MTC apparatus assumes it to be TDD UL-DL configuration 0. In addition, in the case that an MTC apparatus is configured as TDD UL-DL configuration 4, it is proposed that the MTC apparatus assumes it to be TDD UL-DL configuration 3. Then, there exist total four TDD UL-DL configurations 0, 2, 3 and 5 as represented in Table below.

TABLE 8

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0/1/6->0 | D | G | U | U | G | D | G | U | U | G |
| 2 | D | G | U | G | D | D | G | U | G | D |
| 3/4->3 | D | G | U | U | G | D | D | D | D | D |
| 5 | D | S | U | D | D | D | D | D | D | D |

In this case, the parameter value k (Table 8-2 of document 3GPP 36.213) in relation to the position of the downlink subframe on which an uplink grant may be transmitted and the position of the PUSCH transmission subframe for the corresponding uplink grant may be changed as represented in Table below.

TABLE 9

| TDD UL-DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | | | | | 7 | | | | |
| 2 | 7 | | | | | 7 | | | | |
| 3 | | | | | | | | | 4 | 4 |
| 5 | | | | | | | | | 4 | |

In addition, in the case that the PUSCH transmission is performed in subframe n, when a reception subframe of a PHICH for it is the same as subframe n+$k_{PHICH}$, the value of $k_{PHICH}$ (Table 9.1.2-1 of document 3GPP 36.213) may be changed as represented in Table below.

TABLE 10

| TDD UL-DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 8 | 7 | | | | 8 | 7 | |
| 2 | | | 8 | | | | | 8 | | |
| 3 | | | 6 | 6 | | | | | | |
| 5 | | | 6 | | | | | | | |

In addition, in the case that the ACK/NACK transmission for the PDSCH that an MTC apparatus receives in subframe n−$k_i$ is performed in uplink subframe n, the value of $k_i$ (Table 10.1.3.1-1 of document 3GPP 36.213) may be changed as represented in Table below. In the Table below, the set index K in relation to downlink is $\{k_0, k_1, \ldots k_{M-1}\}$.

TABLE 11

| TDD UL-DL configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 7 | — | — | — | — | 7 | — | — |
| 2 | — | — | 8, 7 | — | — | — | — | 8, 7 | — | — |
| 3 | — | — | 12, 8, 7, 6 | 6, 5, 4 | — | — | — | — | — | — |
| 5 | — | — | 13, 12, 11, 9, 8, 7, 6, 5, 4, | — | — | — | — | — | — | — |

The embodiments of the present invention described so far may be implemented through various means. For example, the embodiments of the present invention may be implemented by hardware, firmware, software or the combination thereof. Particularly, this will be described by reference to drawing.

Figure 18:
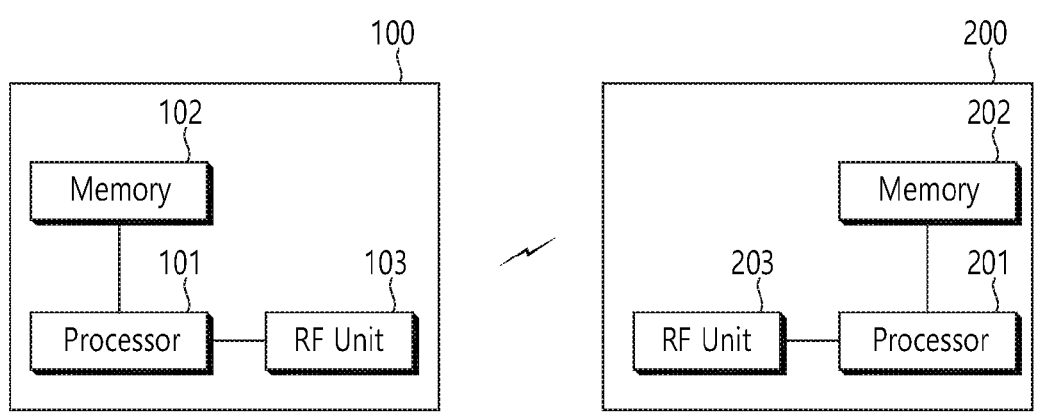
FIG. 18 is a block diagram illustrating a wireless communication system in which a disclosure of the present specification is implemented.

FIG. 18 is a block diagram illustrating a wireless communication system in which a disclosure of the present specification is implemented.

A BS 200 includes a processor 201, a memory 202, and an RF (radio frequency) unit (the MTC apparatus) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

An MTC apparatus 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for monitoring downlink control channels, the method performed by a machine type communication (MTC) apparatus and comprising:
    receiving a first configuration information indicating a first sub-band within a system band of a cell,
    wherein the first sub-band is used to monitor a first downlink control channel in a first search space (SS) and to receive a first downlink data channel scheduled by the first downlink control channel in the first SS;
    switching from the first sub-band indicated by the first configuration information to a second sub-band;
    not receiving a signal on at least one or more front orthogonal frequency-division multiplexing (OFDM) symbols among a plurality of OFDM symbols in a subframe, during the switching; and
    monitoring a second downlink control channel in a second SS within the second sub-band.

2. The method of claim 1, wherein the first downlink control channel in the CSS is an Enhanced Physical Downlink Control Channel (EPDCCH).

3. The method of claim 1, further comprising:
    receiving the first downlink data channel within the first sub-band indicated by the first configuration information.

4. The method of claim 1, further comprising:
    receiving a second configuration information indicating a subframe for monitoring the second downlink control channel in the second SS within the second sub-band,
    wherein at least one of the first configuration information or the second configuration information is received through a high layer signaling.

5. A machine type communication (MTC) apparatus for monitoring downlink control channels, comprising:
    a transceiver; and
    a processor for controlling the transceiver, wherein the processor is configured to perform:
        receiving a first configuration information indicating a first sub-band within a system band of a cell,
        wherein the first sub-band is used to monitor a first downlink control channel in a first search space (SS) and to receive a first downlink data channel scheduled by the first downlink control channel in the first SS,
        switching from the first sub-band indicated by the first configuration information to a second sub-band;
        not receiving a signal on at least one or more front orthogonal frequency-division multiplexing (OFDM) symbols among a plurality of OFDM symbols in a subframe, during the switching; and
        monitoring a second downlink control channel in a second SS within the second sub-band.

6. The MTC apparatus of claim 5, wherein the processor is further configured to receive, via the transceiver, a second configuration information indicating a subframe for monitoring the second downlink control channel in the CSS within the second sub-band.

* * * * *